United States Patent [19]
Horii et al.

[11] Patent Number: 5,291,304
[45] Date of Patent: Mar. 1, 1994

[54] FACSIMILE APPARATUS HAVING INVOICE SENTENCE PREPARATION FUNCTION

[75] Inventors: Masakuni Horii, Ootsu; Eiichi Morimoto, Kyoto; Hiroyasu Yoshikawa, Tsuzuki, all of Japan

[73] Assignee: Murata Kikai Kabushiki Kaisha, Kyoto, Japan

[21] Appl. No.: 797,143

[22] Filed: Nov. 25, 1991

Related U.S. Application Data

[63] Continuation of Ser. No. 510,039, Apr. 17, 1990, abandoned.

[30] Foreign Application Priority Data

Apr. 18, 1989 [JP] Japan .................. 1-45449[U]

[51] Int. Cl.$^5$ .................. H04N 1/00; H04N 1/387
[52] U.S. Cl. .................. 358/434; 358/440; 358/450
[58] Field of Search .............. 358/434, 450, 452, 453, 358/400, 402, 403, 404, 407, 440

[56] References Cited

U.S. PATENT DOCUMENTS

| | | | |
|---|---|---|---|
| 3,542,378 | 9/1985 | Suganuma et al. | 358/450 |
| 3,678,180 | 7/1992 | Bond | 358/407 |
| 4,322,157 | 3/1982 | Miura et al. | 358/452 |
| 4,870,503 | 9/1989 | Miura | 358/434 |
| 5,001,572 | 3/1991 | Hashimoto et al. | 358/440 |

FOREIGN PATENT DOCUMENTS 53-5520  1/1978  Japan .................. 358/440

*Primary Examiner*—Stephen Brinich
*Assistant Examiner*—Thomas D. Lee
*Attorney, Agent, or Firm*—Spensley Horn Jubas & Lubitz

[57] ABSTRACT

Various kinds of data such as destination addresses, messages to be transmitted are registered beforehand while they are made to correspond to respective abbrebiated dialing numbers or one-touch dial numbers. The invoice format into which the data will be written is stored in a storage unit. At the time of the transmission, the invoice format is read out by inputting the abbreviated dialing number or the one-touch dial key, and the data are written into the pertinent address in the format.

6 Claims, 6 Drawing Sheets

FACSIMILE APPARATUS HAVING INVOICE SENTENCE PREPARATION FUNCTION

This is a continuation of application Ser. No. 07/510,039 filed on Apr. 17, 1990, now abandoned.

BACKGROUND OF THE INVENTION

1. Technical Field

The present invention relates to a facsimile apparatus which is capable of preparing various kinds of invoice sentences.

2. Background Art

A conventional facsimile apparatus of this kind has a constitution in which, at first, a read unit reads out an invoice sentence (cover letter) such as a superscription of a destination, a message to be transmitted (For example, the sentence "please deliver this promptly."), the date and time of the transmission, and so forth, and next, the read unit reads out a correspondence (a piece of information on the transmission), and then combines these data to carry out in sequence multi-address or multi-destination calling for a plurality of destinations.

In the above-mentioned conventional example, however, it is necessary to prepare an invoice sentence different for each destination by handwriting. Moreover, since a correspondence is always combined with a message before transmission, it is impossible to send one of them separately. With these respects, conventional facsimile apparatuses are not convenient.

SUMMARY OF THE INVENTION

An object of the present invention is to provide a facsimile apparatus having the function of multi-address calling which brings remarkable improvement in handling.

A facsimile apparatus according to the present invention is characterized in that various kinds of destination addresses, a message to be transmitted and so forth are registered beforehand while they are made to correspond to respective abbreviated dialing numbers or one-touch dial numbers, and at the same time, the format for an invoice sentence into which the data such as the address, the message, date and time of the transmission can be written is stored in a storage unit, and at the time of the transmission, the above-mentioned format is read out by operating the abbreviated dialing number or the one-touch dial key, and data read out from the storage unit are written into the pertinent address in the format. The invoice may be transmitted with a manuscript or transmitted alone.

The address of destination, the message to be transmitted and so forth which have been stored in the storage unit are properly selected to read out desired data, and these read out data are written into the format, whereby an individual invoice sentence can be prepared. The address of destination, the message to be transmitted, date and time of transmission, and so forth can be added to the information on the transmission by only inputting an abbreviated dialing number, one-touch number or a telephone number using a ten key set. Therefore, manual operation is remarkably reduced.

Moreover, various forms of transmission can be assumed with easier operation.

Furthermore, a handwritten invoice sentence is no longer necessary.

DESCRIPTION OF THE PREFERRED EMBODIMENTS

Hereinafter, an embodiment according to the present invention will be described concretely with reference to drawings.

Figure 1:
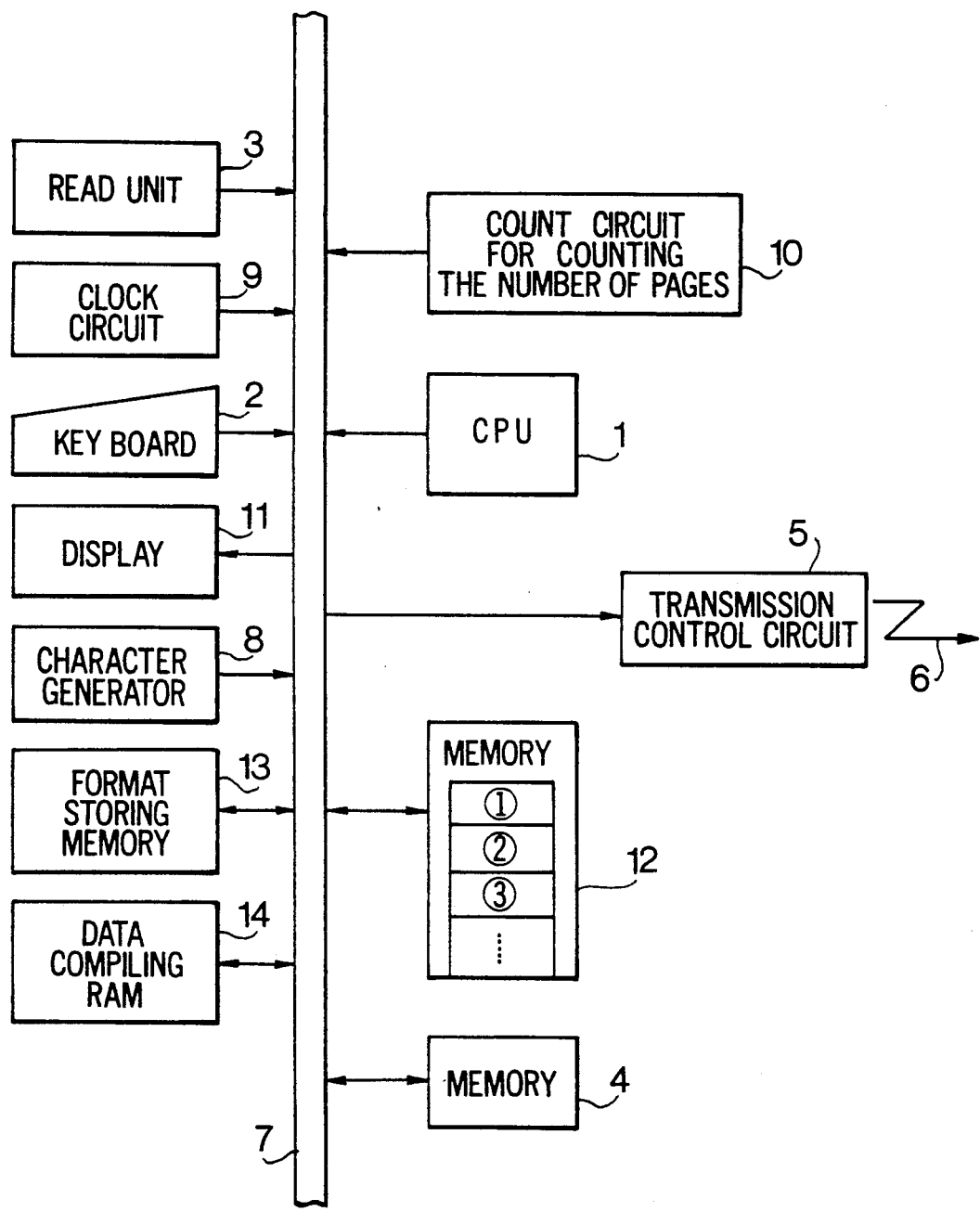
FIG. 1 is a block diagram showing a facsimile apparatus applied with the present invention.

Referring to FIG. 1 of the accompanying drawings, a CPU 1 is a unit which forms a control center for controlling the transmission, the reception, and the multiple address calling of a facsimile apparatus, and the transmission operation is carried out in a manner described below.

When an operator operates a key for transmission (not shown) on a key board 2 provided with a ten key set, and one-touch key and so forth, and sets a manuscript (not shown) in the facsimile apparatus, a readout unit 3 reads this manuscript as an image signal, and the read out image signal data are once stored into an image signal data recording memory 4. At this time, on the other hand, the CPU 1 performs the connection of a line 6 via a transmission control circuit 5.

With the completion of the connection with the line 6, image signal data which will be sent to a facsimile apparatus of a destination are added with information on date and time of the transmission and the information on pages. The CPU 1 takes out the information on the time of the transmission from a clock circuit 9 and the information on the pages to be transmitted from a page number counting circuit 10. The CPU 1 converts these pieces of information into image signal data by a character generator 8, combines the image signal data with the above-mentioned image signal data (manuscript), and then sends the combined data to the destination.

Figure 2:
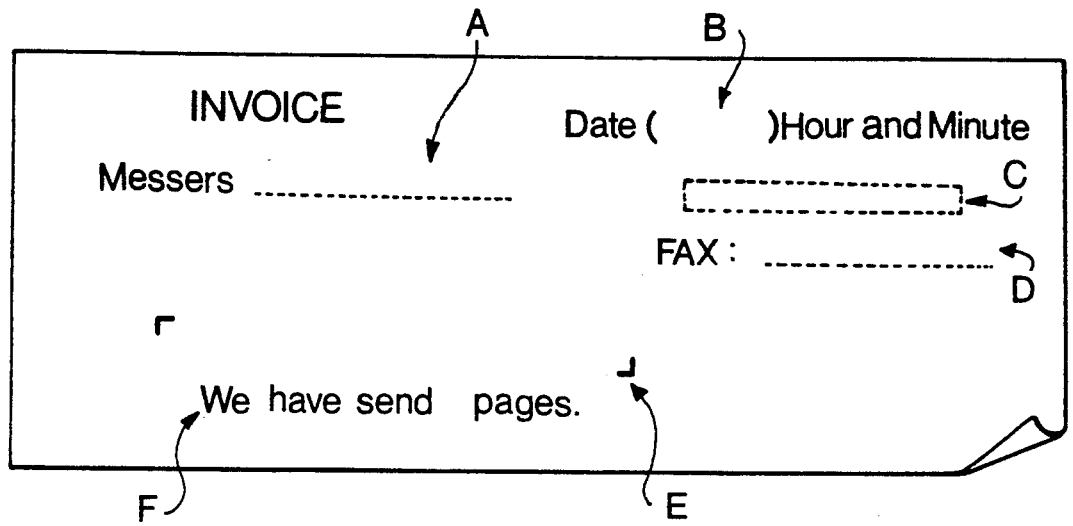
FIG. 2(a) is a drawing showing a format for an invoice sentence in a buffer memory.
FIG. 2(b) illustrates a format for an invoice sentence written into a RAM.
Figure 2:
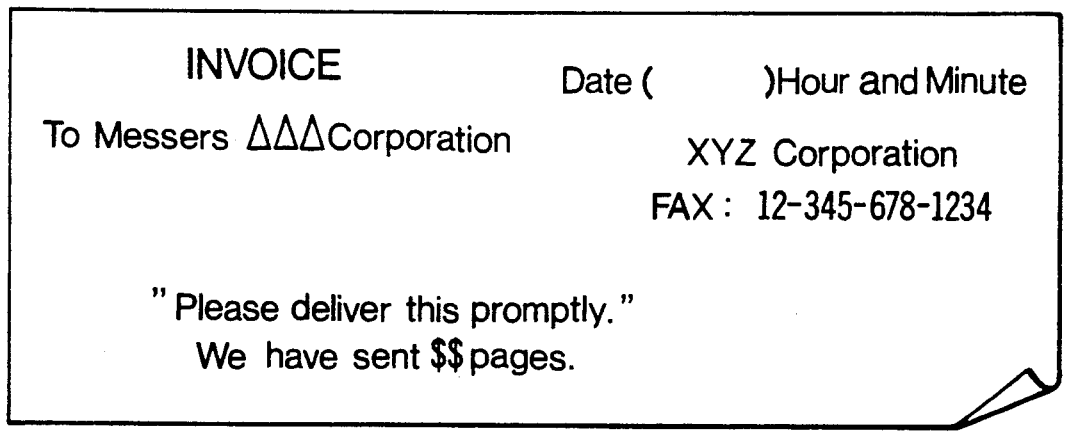

The facsimile apparatus is further provided with a function of multiple address calling of transmitting the same or different information to a plurality of destinations in sequence, and moreover a function capable of adding various messages for different destinations. These functions are realized by a memory 12, a format storing memory 13 and a data compiling RAM 14. Specifically, pieces of information (hereinafter it is called as "registered data") on a telephone number of destination, an address of destination, and a message to be transmitted which are made to correspond to an abbreviated dialing number or an one-touch dial key, and a serial number of the facsimile itself and a name of sender, which are not made to correspond to an abbreviated dialing number or an one-touch dial key are registered beforehand in the conversion table in the memory 12 shown by ①, ②, ③, - - - in FIG. 1. On the other hand, a format for an invoice sentence as shown in FIG. 2(a) is recorded as fixed data in the format storing memory 13. At the time of the preparation of the invoice sentence, contents in the format storing memory 13 are transferred to the data compiling RAM 14. Accordingly, necessary data are written into pertinent address positions of the format, that is, a blank A for date and time of the transmission, a blank B for an address of destination, a blank C for a name of a sender, a blank D for a serial number of a facsimile number, a blank E for a message and a blank F for the number of pages, by which an individual invoice sentence can be prepared on the data compiling RAM 14.

The concrete preparation of the invoice sentence can be carried out by writing the format and the registered data read out of the memory 12, into addresses of the data compiling RAM 14. In other words, the CPU 1 reads out in sequence the format data stored in addresses in the format storing memory 13, and writes the read out data into addresses in the data compiling RAM 14. At the same time, when the addresses in the format storing memory 13 which are shifted in sequence upon each reading out are positioned at the addresses corresponding to the blanks of the above-mentioned format data, the CPU 1 reads out the pertinent data from the above-mentioned registered data and writes the read out data into the pertinent addresses in the data compiling RAM 14, thereby preparting the invoice sentence.

Thus, as shown in FIG. 2(b), an invoice sentence having different contents for each destination is prepared as a piece of individual information in the RAM 14.

Next, the CPU 1 inputs an invoice sentence (information on character codes) prepared in the RAM 14 into the character generator 8 via the control bus 7, in which the image signal character codes are converted into image signal data and image signal data are transmitted to a facsimile apparatus of a destination via the line 6.

The multi-address calling is carried out by turning on a multi-destination calling key on the key board 2. Also, the action of registering the above-mentioned registered data into the memory 12 is carried out by manually manipulating the ten key and the one-touch key on the key board 2. In order to make the operator carry out this key operation securely, the registered data such as the message are indicated on a screen of a display 11.

Next, a concrete procedure for transmission operation will be described in compliance with FIGS. 3(a) and 3(b) and FIGS. 4(a) and 4(b).

Figure 3A:
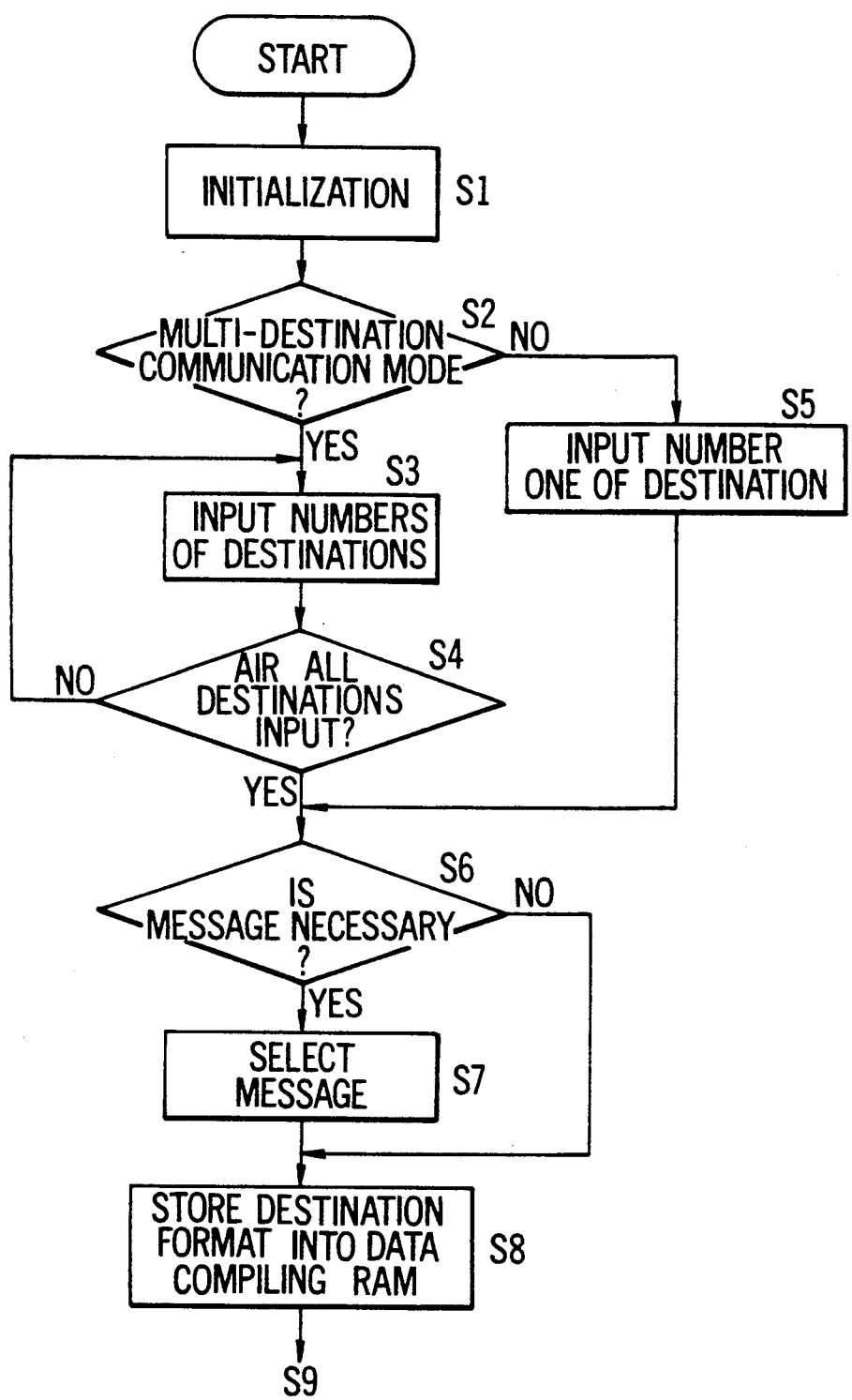
FIGS. 3(a) and 3(b) illustrate in combination a flowchart showing entire transmission operation.
Figure 3B:
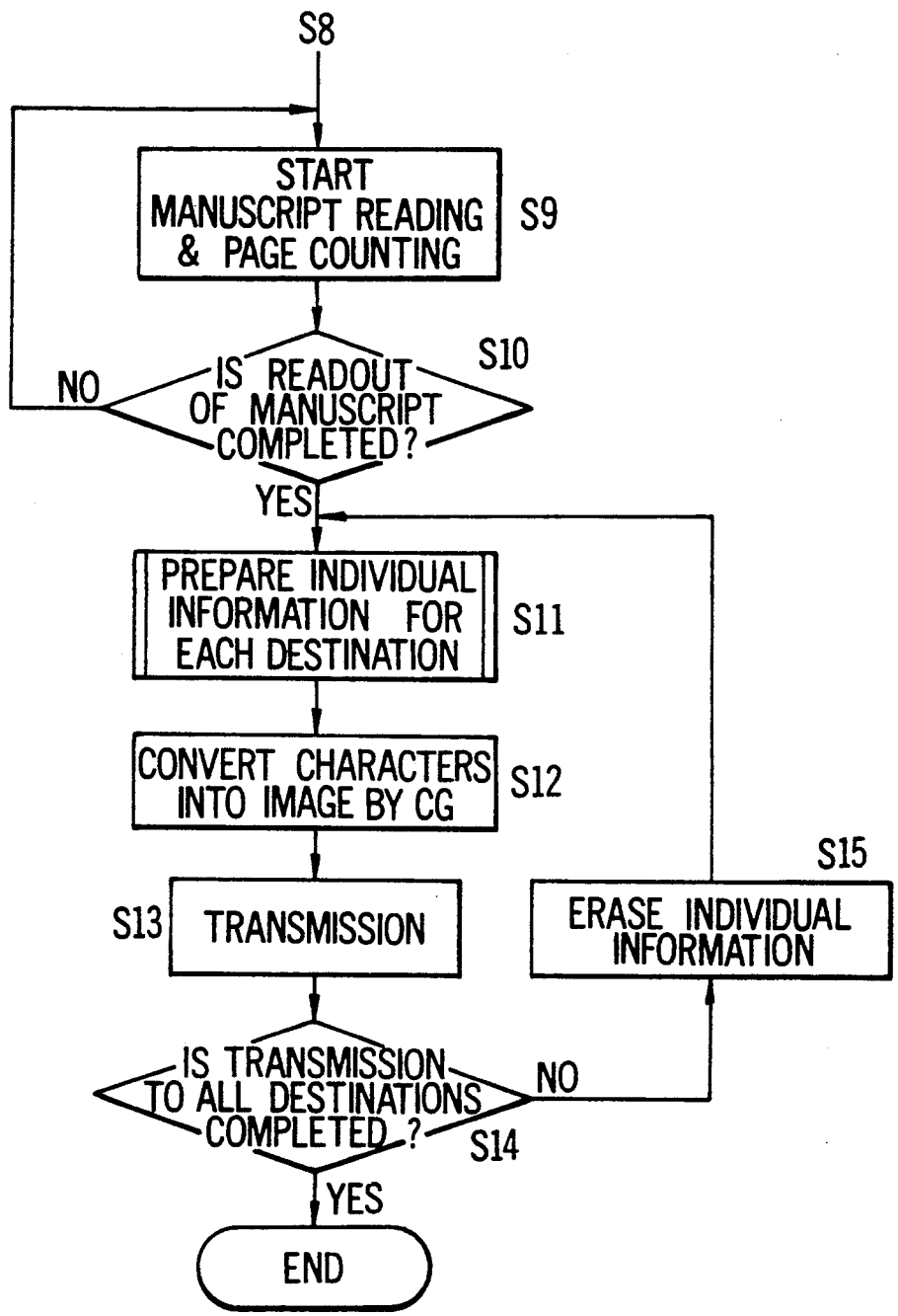
Figure 4A:
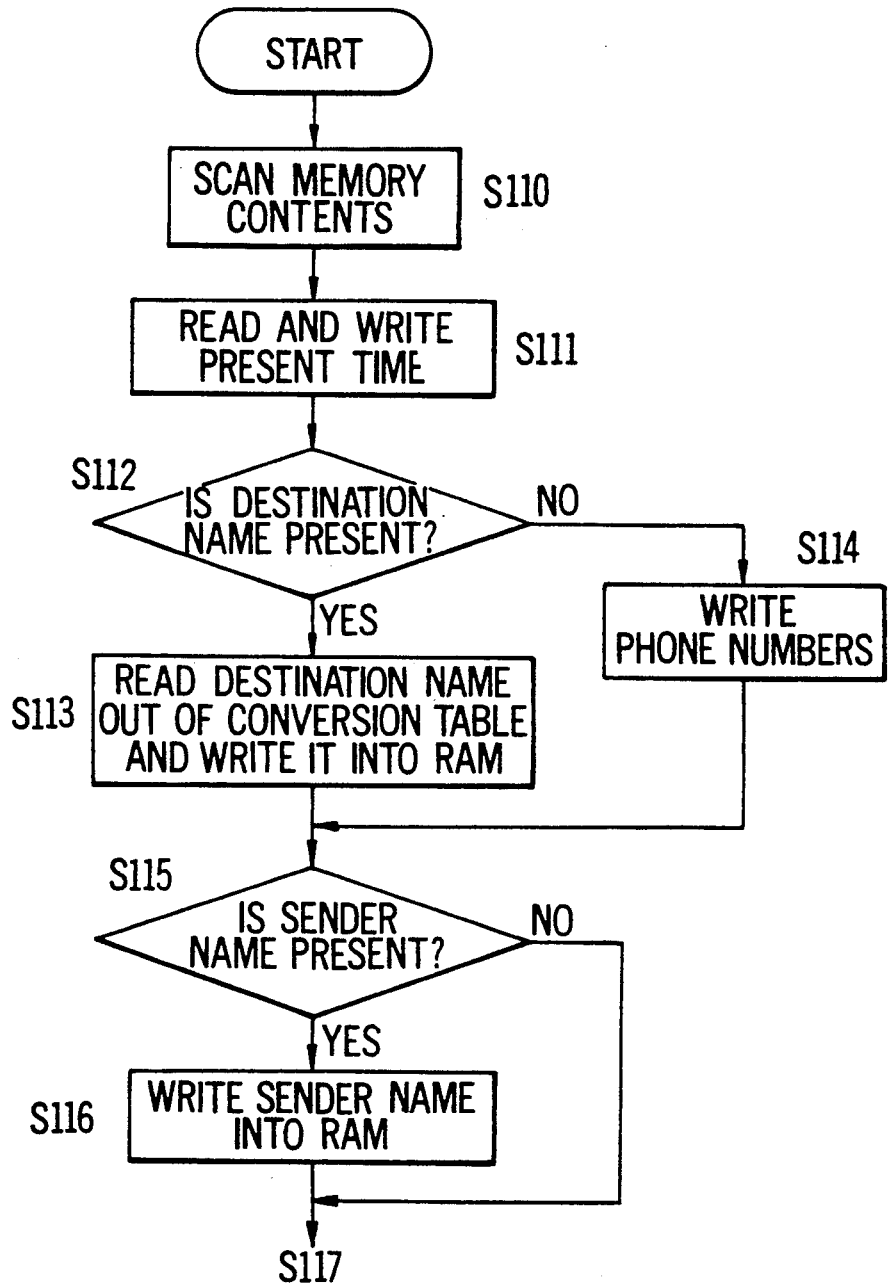
FIGS. 4(a) and 4(b) illustrate in combination a flowchart showing a procedure for writing a piece of individual information.
Figure 4B:
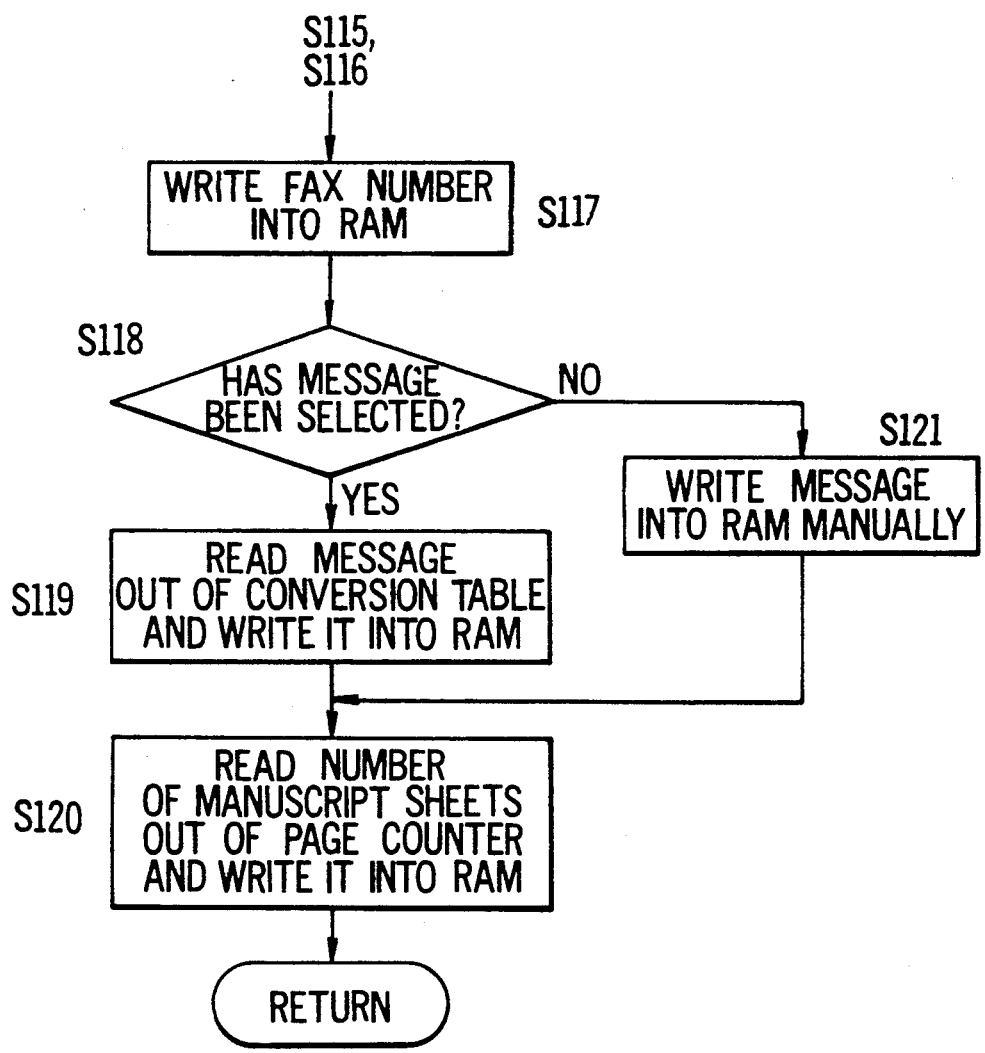

Here, FIGS. 3(a) and 3(b) are in combination a main flowchart for an entire transmission operation, and FIGS. 4(a) and 4(b) are in combination a flowchart for a writing operation of individual information during the multi-destination calling.

When the operator turns on an initialization key on the key board 2, a control program is applied with its initialization operation (S1). Thereafter, the CPU 1 checks whether the transmission mode is in a multi-address calling mode or a single-address calling mode (an ordinary calling mode) (S2). When it is confirmed that the multi-destination calling key is turned on and the multi-destination calling mode is established, the input operation of plural telephone numbers (a plurality of destinations) are conducted (S3). The telephone number input operation is conducted by the operator who manipulates the key board 2, as described above, and at the same time, the telephone numbers of the destinations are indicated on the display 11. Then, the CPU 1 sees whether telephone number input operation for all destinations have been completed or not (S4). If the CPU 1 confirms the completion, the program proceeds to step 6 (S6), and the CPU 1 checks whether a message is necessary or not. In a case of ordinary calling (single destination calling), the program proceeds to the step 5 from step 2 and the telephone number of one destination is input.

In the case where a message is necessary, the pertinent message is chosen from a plurality of messages which have been registered in the table memory 12, and the selected message is stored in the pertinent conversion table (S7). In an actual case, an operator manipulates the key board 2 to display in sequence various kinds of a message to be transmitted on the display 11, and selects the pertinent message.

When a message to be transmitted is selected, a format for a destination as shown in FIG. 2(a) is prepared (stored) in the data compiling RAM 14. In other words, the fixed data of the invoice such as the date, the day of the week, the hour and minute are stored in the pertinent address in the data compiling RAM 14 (S8).

Next, the CPU 1 sends a readout execution command signal to the readout unit 3 via the control bus 7. Thereupon, the readout unit 3 conducts a readout operation for a manuscript, and at the same time, the count circuit 10 counting the number of pages is started (S9). After confirming the completion of the readout of manuscript (S10), the CPU 1 executes a subroutine of step 11 (S11), and prepares one invoice sentence for each destination, that is, an individual invoice sentence in the RAM 14.

Next, an invoice sentence preparation procedure will be described in compliance with FIG. 4. The CPU 1 starts scanning the address information in the format storing memory 13. At first, the CPU 1 writes "INVOICE" of FIG. 2(a) into a corresponding address in the data compiling RAM 14 (S110). Subsequently, when an address in the format storing memory 13 reaches the blank, into which date and time of the transmission are to be written, that is, the blank A of FIG. 2(a), the CPU 1 reads out a piece of information on the date and time of transmission from the clock circuit 9, and writes the read out data into an address in the RAM 14, whereby a piece of information on the date and time of the transmission, that is, __year, __month, __th day (a day of the week), __hour and __minute (S111) is prepared as shown in FIG. 2(b).

When the preparation operation has been completed, the CPU 1 conducts the similar scanning again. When an address in the format storing memory 13 reaches the blank B into which a name of destination is to be filled, it is checked if destination data to be first transmitted are registered into the destination data which have been stored in the memmory 12 (S112). In the case where the particular destination data have been registered, the CPU 1 reads out the data from the memory 12, and writes Δ Δ Δ corporation shown in FIG. 2(b) into the pertinent address in the data compiling RAM 14 (S113). In the case where the destination data have not been registered, the CPU 1 writes the telephone number of the destination in place of the name of destination data as shown in step 114 (S114).

Next, the CPU 1 repeats a similar scanning. When an address in the format storing memory 13 reaches the blank C, into which names of senders (dispatchers) are to be filled up, the CPU 1 checks whether the pertinent name of the sender is registered in the memory 12 or not (S115). When the CPU 1 confirms the registration, it writes XYZ Corporation as shown in FIG. 2(b) into the pertinent address in the data compiling RAM 14 (S116). Similarly, the CPU 1 writes the facsimile number 12-345-678-1234 (see FIG. 2(b)) into the blank D into which the facsimile number is to be filled up (S117).

Next, when an address in the format storing memory 13 reaches the blank E into which a message to be transmitted is to be filled up, the CPU 1 checks at step 118 whether or not the message to be transmitted is selected in step 7 (S7). Confirming that the message has been selected, the CPU 1 reads out the message from the memory 12 and writes the message, for example "please deliver this message promptly" as shown in FIG. 2(b), into the pertinent address in the data compiling RAM 14 (S119). Subsequently, the CPU 1 conducts the similar scanning again, and finally writes the count value of the count circuit 10 counting the number of pages, that is, the data ## of the number of sheets of the manuscript to be transmitted (S120) (see FIG. 2(b)), and therefater returns to the main flow.

Moreover, in the case where the message to be transmitted has been not selected in step 118 (S118), an operator manipulates keys such that the CPU 1 writes the message, as described above, into the pertinent address of the data compiling RAM 14 (S121), and then the program returns to the main flow.

Upon the completion of writing a piece of individual information given by the above-mentioned subroutine, the format data in the data compiling RAM 14 is input into the character generator 8, in which a piece of information on character codes are converted into image signal data (S12). The CPU 1 transmits the image signal data, after conversion to the facsimile apparatus of the destination (S13) via the line 6, and then judges whether or not the transmission operation of the image signal data to all the destinations has been completed (S14). The program goes to END after confirming the completion of the transmission. Moreover, as shown in step 15 (S15), when the transmission operation for one destination is completed, the CPU 1 erases the individual information just made in the data compiling RAM 14, and prepares another individual information for the next destination.

In the transmission of step 13 (S13), the invoice sentence may be separated from piece of individual information, i.e., the invoice sentence alone may be transmitted, or the first page of the information may be combined with the end of the invoice sentence. In the latter case, the count value of the page count circuit 10 is made different from the value in the former case and then written into the data compiling RAM 14.

We claim:

1. A facsimile apparatus comprising:
    data registration means for registering recipient data and caller identification data to be transmitted and for establishing a correspondence between the registered recipient data and a predetermined telephone number, the predetermined telephone number comprising an abbreviated number;
    a format storage unit for storing an invoice format in character code having predetermined addresses into which the registered recipient data and caller identification data are written;
    means for inputting the predetermined telephone number;
    means for reading out the invoice format in character code in response to the input of the predetermined telephone number; and
    means for reading out the registered recipient data and caller identification data from the data registration means and for writing the registered recipient data and caller identification data into the predetermined addresses in the invoice format in response to the input of the predetermined telephone number,
    a character generator for converting the invoice format and the registered recipient data and caller identification data into image signal data,
    whereby the invoice format and the registered recipient data and caller identification data are combined in character code and a complete invoice is automatically prepared and transmitted as image signal data in response to the input of the predetermined telephone number.

2. The facsimile apparatus of claim 1, wherein the predetermined abbreviated telephone number comprises a one-touch number.

3. The facsimile apparatus of claim 1, further comprising:
    a clock circuit for generating date and time data identifying the date and time of transmission;
    a page count circuit for counting the number of pages transmitted and for generating page count data identifying the number of pages transmitted; and wherein
    the character generator comprises means for converting the data and time data and the page count data into image data and for adding the image data to the data written in the invoice format.

4. The facsimile apparatus of claim 3, further comprising a display for showing the data identifying the date and time of transmission.

5. The facsimile apparatus of claim 1, further comprising a reader for reading characters written on a manuscript to be transmitted with the invoice and for converting the characters into image signals.

6. The facsimile apparatus of claim 1, further comprising a display for showing the data to be transmitted.

* * * * *